United States Patent [19]

Ohta et al.

[11] Patent Number: 5,703,340
[45] Date of Patent: Dec. 30, 1997

[54] METHOD AND APPARATUS FOR FORMING A HOLE FOR USING COOLING AIR IN HOLE FORMING PROCESS

[75] Inventors: Tatsuya Ohta, Hanyu; Masami Moritani, Niigata-Ken, both of Japan

[73] Assignee: Fuji Jukogyo Kabushiki Kaisha, Tokyo, Japan

[21] Appl. No.: 504,963

[22] Filed: Jul. 20, 1995

[30] Foreign Application Priority Data

Jul. 21, 1994 [JP] Japan ................. 6-190149

[51] Int. Cl.⁶ ................................. B23K 10/00
[52] U.S. Cl. ................. 219/121.48; 219/121.39; 219/121.58; 219/121.49
[58] Field of Search ............. 219/121.37, 121.38, 219/121.48, 121.49, 121.59, 121.39, 121.7, 121.71, 121.84, 121.58

[56] References Cited

U.S. PATENT DOCUMENTS

| | | | |
|---|---|---|---|
| 4,063,059 | 12/1977 | Brolund et al. | 219/121 P |
| 4,407,404 | 10/1983 | Rise et al. | 198/774 |
| 5,026,965 | 6/1991 | Ohe et al. | 219/121.7 |
| 5,073,694 | 12/1991 | Tessier et al. | 219/121.7 |
| 5,345,057 | 9/1994 | Muller | 219/121.71 |
| 5,436,426 | 7/1995 | Nerz et al. | 219/121.49 |

*Primary Examiner*—Mark H. Paschall
*Attorney, Agent, or Firm*—Beveridge, DeGrandi, Weilacher & Young, L.L.P.

[57] ABSTRACT

A hole forming apparatus for forming a hole through the side wall of a hollow elongated work without any adhesion of dross generated not only during hole forming operation to the inner wall surface of the work but also without any burning of a rust preventing oil. To cool the working location, cooling air is blown through the opening end of the work so as to generate a stream of cooling air in the interior of the work.

6 Claims, 8 Drawing Sheets

METHOD AND APPARATUS FOR FORMING A HOLE FOR USING COOLING AIR IN HOLE FORMING PROCESS

BACKGROUND OF THE INVENTION

1. Field of the Invention

The present invention relates generally to hole forming method and apparatus. More particularly, the present invention relates to hole forming method and apparatus each of which assures that holes are formed through an elongated hollow member not only while preventing dross arising during hole forming operation from adhering to the inner surface of a work such as a chassis frame or the like but also while preventing rust proofing oil from burning during the hole forming operation.

2. Description of the Related Art

In general, many hollow elongated side members are used as chassis frames for a vehicle. A desired number of holes each having a predetermined diameter are formed through a side wall of each side member so that components are attached to the side member by using the formed holes. Some of these kinds of chassis frames are shipped after completion of given workings so that they are assembled with other components at a remote location in a foreign country. To prevent rust from generating on the surface of the chassis frame during shipping, the surface of the chassis frame is coated with rust proofing oil. However, there is a problem that the rust proofing oil is burnt by heat given during hole forming operation or dross generated during hole forming operation adheres to the opposite inner wall surface of the chassis frame, causing the rust to generate around the dross, resulting in a part of the chassis frame inclusive the dross undesirable rusting.

SUMMARY OF THE INVENTION

The present invention has been made in consideration of the aforementioned background and its object resides in providing hole forming method and apparatus each of which assures that a desired number of holes each having a predetermined diameter are formed on a hollow elongated work not only without any deposition of dross or chip generated during hole forming operation to the inner side surface of the work but also without any burning of the rust preventing oil coated on the wall surface of the work.

According to one aspect of the present invention, there is provided a hole forming apparatus comprising a base frame, a plurality of work supporting stands standing upright from the base frame to firmly hold a hollow elongated work, a work lifter for vertically displacing the work between the working position and the standby position, a hole forming tool for forming a hole having a predetermined diameter through the side wall of the work, and a cold air blowing unit arranged in the vicinity of an opening portion at one end of the work to feed cooling air into the work.

It is preferable that a plasma torch or a laser beam hole forming unit is employed for the a hole forming tool.

It is preferable that the cold air blowing unit consists of a thrust block adapted to be displaced toward the opening end of the work in the forward/rearward direction, a cooling head supported by the thrust block, and a cooling air nozzle held on the cooling head.

It is preferable that the cooling head is located directly in front of the opening end of the work with a predetermined distance left therebetween so as to allow environmental air to be introduced into the work.

In addition, according to other aspect of the present invention, there is provided a hole forming method comprising the step of firmly holding a hollow elongated work on a work support stand, forming a hole at a predetermined position through the side wall of the work with the aid of a hole forming tool, and blowing the cold air to the working location through an opening portion at one end of the work.

Other objects, features and advantages of the present invention will become apparent from the following description by referring the accompanying drawings.

DESCRIPTION OF THE PREFERRED EMBODIMENT

The present invention will now be described in detail hereinafter with reference to the accompanying drawings which illustrate a preferred embodiment thereof.

Figure 1:
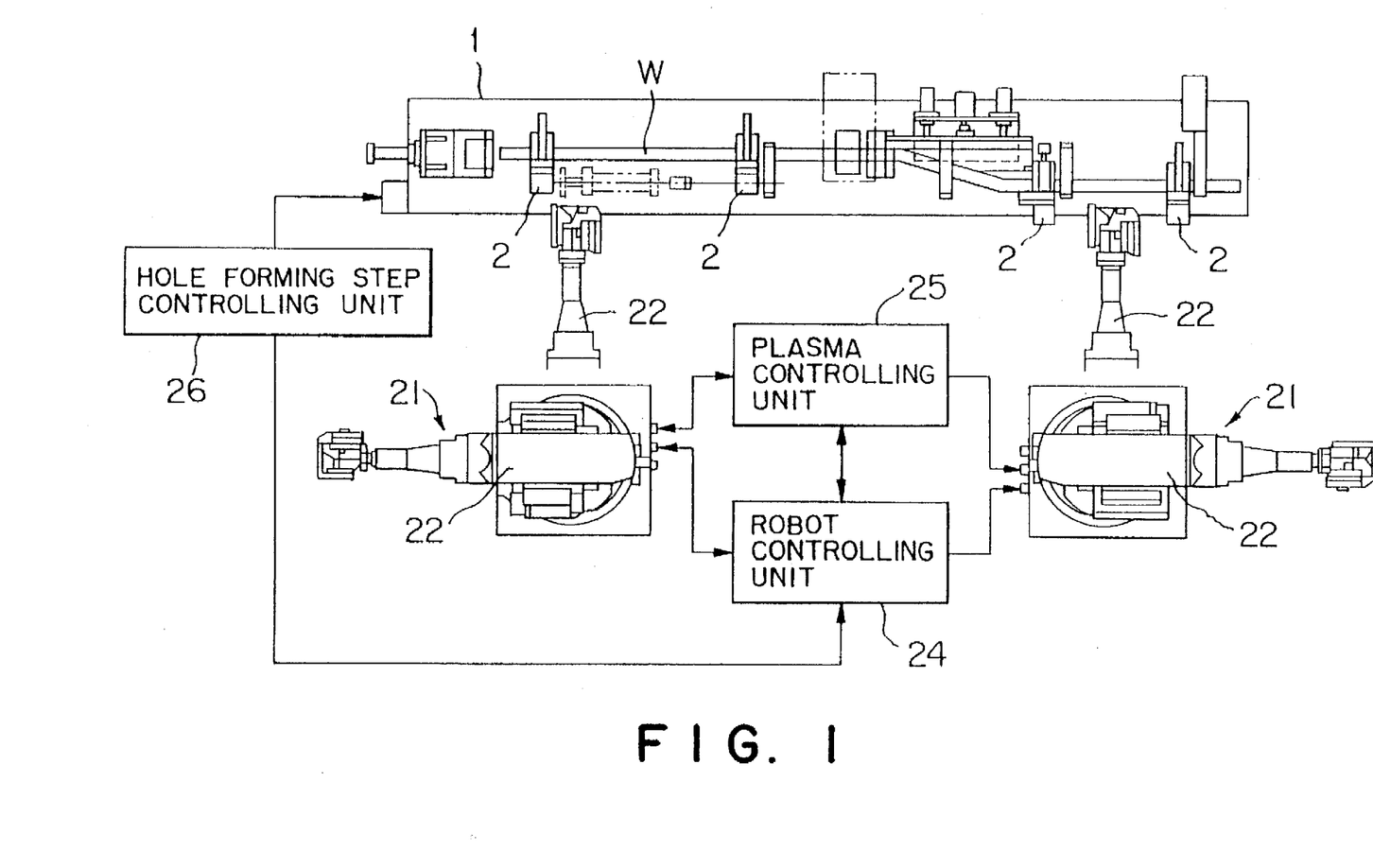
FIG. 1 is a plan view which shows a hole forming apparatus of the present invention.
Figure 2:
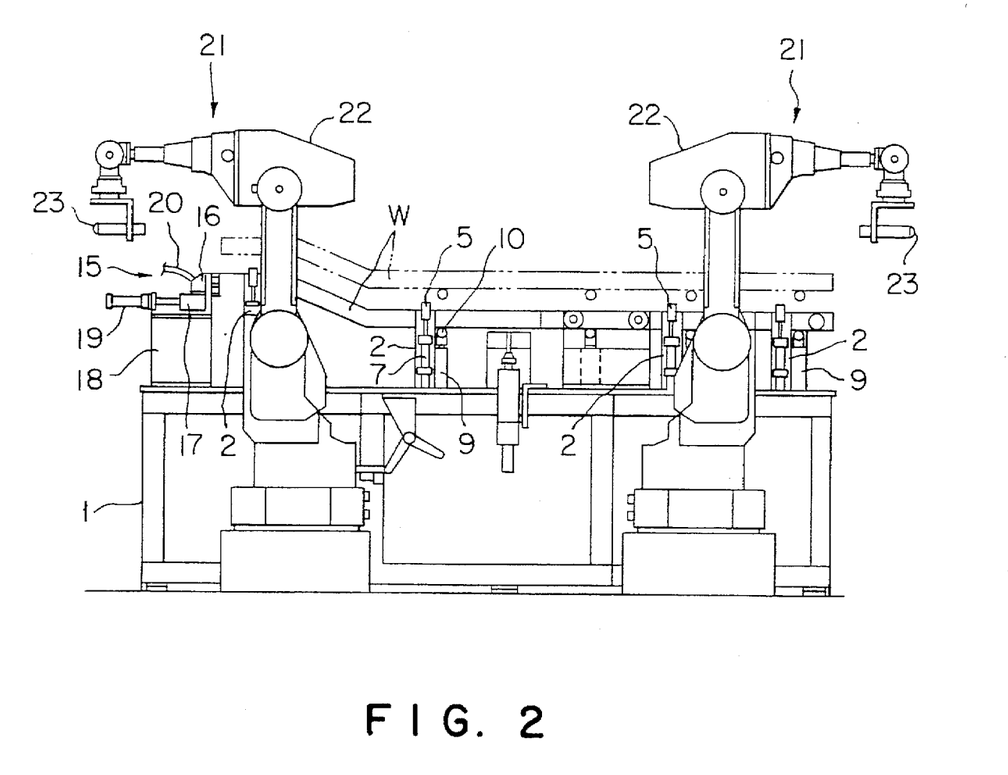
FIG. 2 is a side view which shows the hole forming apparatus of the present invention.
Figure 3:
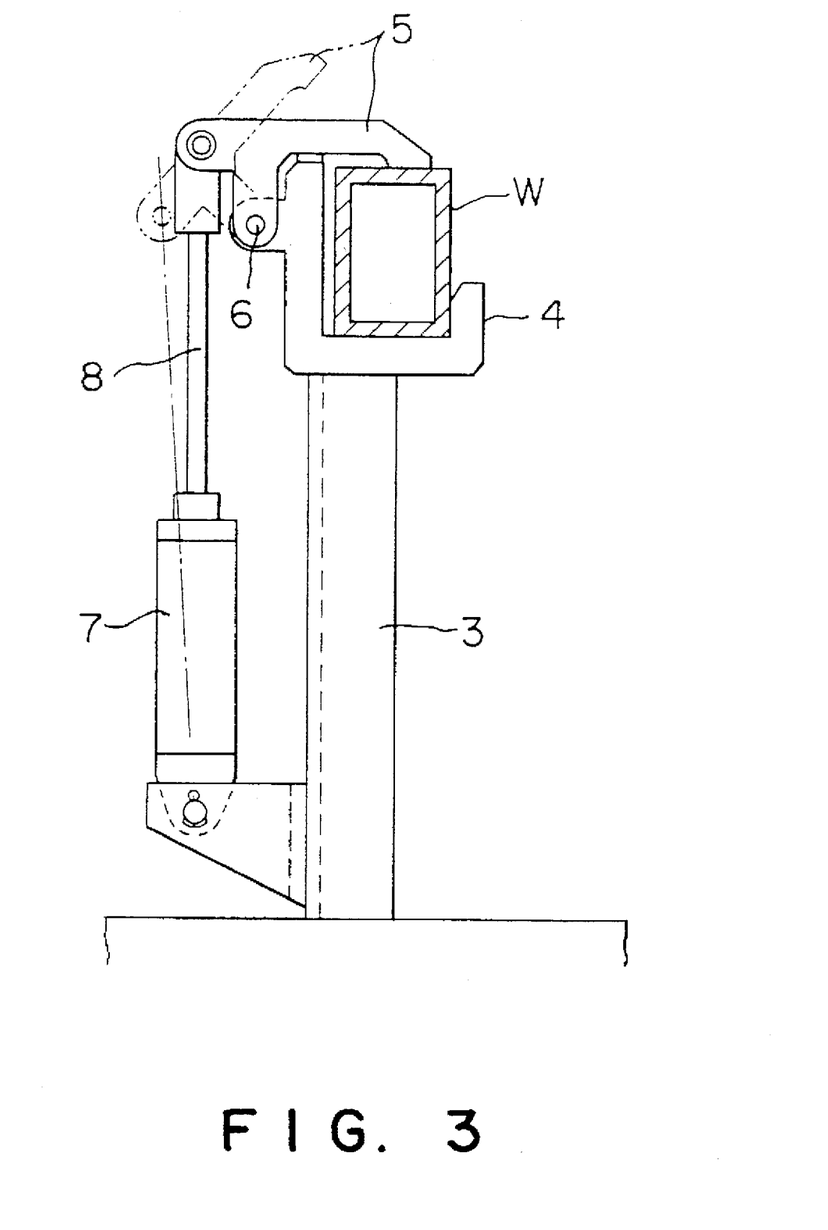
FIG. 3 is a side view which shows the structure of a work supporting stand.

In FIG. 1 to FIG. 3, reference numeral 1 denotes a base frame. Four work supporting stands 2 stand upright from the base frame 1. As shown in FIG. 3, each work supporting stand 2 includes a stationary column 3 to which upper end an angle-shaped work holder 4 is fixedly secured. A clamp member 5 is turnably supported at the left-hand side of the work holder 4 to turn about a pivotal shaft 6, and an upper end of a piston rod 8 of a driving cylinder unit 7 is pin-connected to the left-hand end of the clamp member 5. With this construction, a hollow elongated work W is firmly held on the work holder 4 with a substantially horizontal attitude by placing the work W on the work holder 4 and firmly depressing the work W with the clamp member 5.

In addition, a work lifter 9 stands upright on the base frame 1. The work lifter 9 includes a vertical rod 11 with a roller 10 supported at an upper end thereof, and the lower end of the vertical rod 11 is operatively connected to one arm 12a of a bell crank 12. Other arm 12b of the bell crank 12 is pin-connected to an actuating rod 13 adapted to move in the horizontal direction. The actuating rod 13 is reciprocably displaced by actuating a drive cylinder 14.

Figure 5:
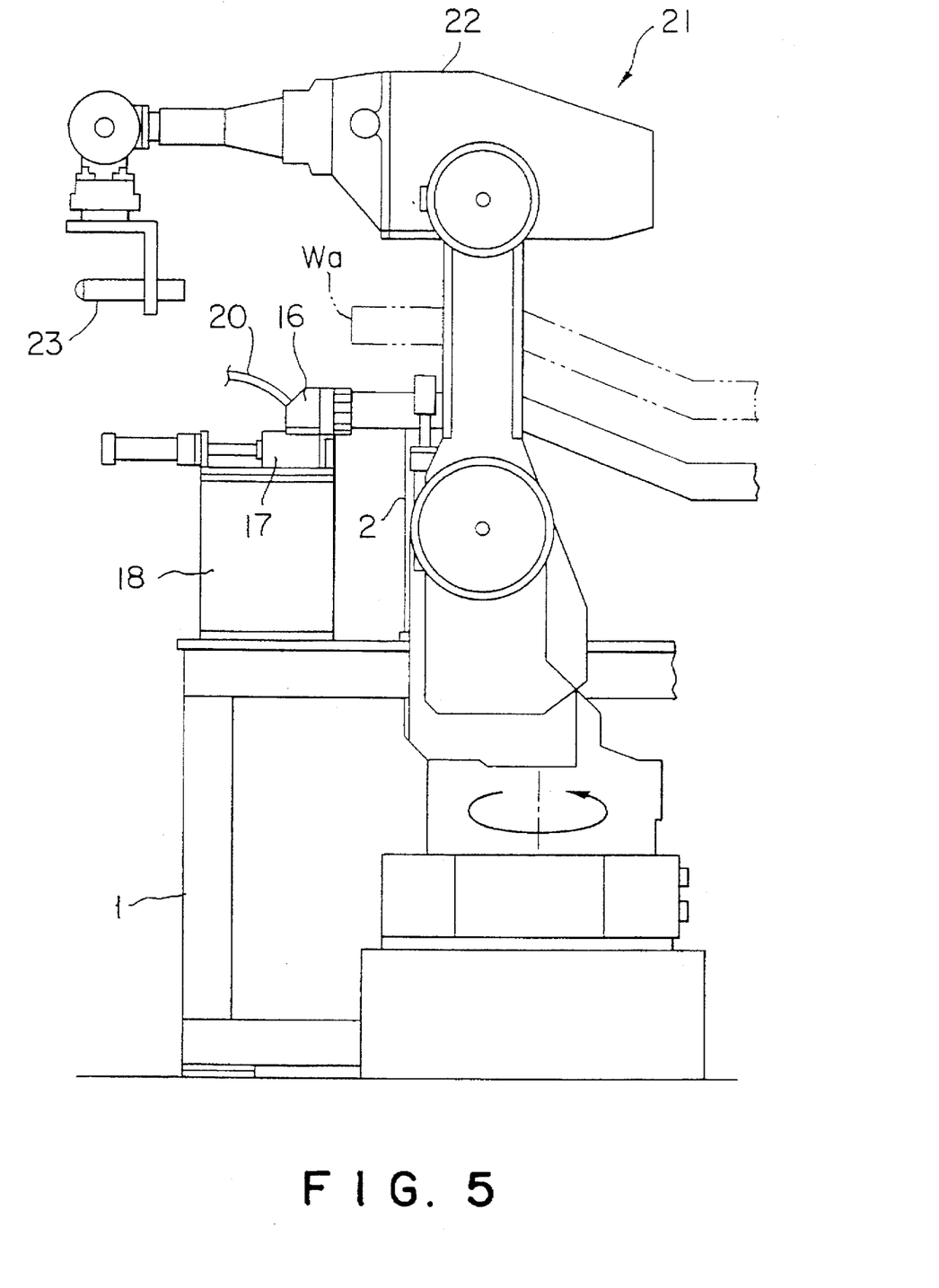
FIG. 5 is a side view which shows a cooling air feeding unit of the present invention.

According to the present invention, a cold air blowing unit 15 is arranged in the proximity of an opening portion of the hollow elongated work W at the left end of the latter. This cold air blowing unit 15 includes a cooling head 16 which is placed on a trusting block 17. The thrusting block 17 is displaceably placed on a bracket 18 to be displaced in the forward/rearward direction by actuating a driving cylinder 19. The cooling head 16 is equipped with a cooling nozzle 20 of which one end is connected to a suitable cooling air supply source.

A pair of work robots 21 are arranged on one side of the base frame 1, and a turnable and vertically displaceable robot arm 22 holds a hole forming tool, e.g., a plasma torch 23. A laser beam working unit may be substituted for a plasma torch 23. A robot controlling unit 24 controls turning and vertical displacement of each work robot 21, and a plasma control unit 25 controls radiation and stoppage of the plasma torch 23. The robot control unit 24 is electrically connected to a hole forming step controlling unit 26.

Figure 6:
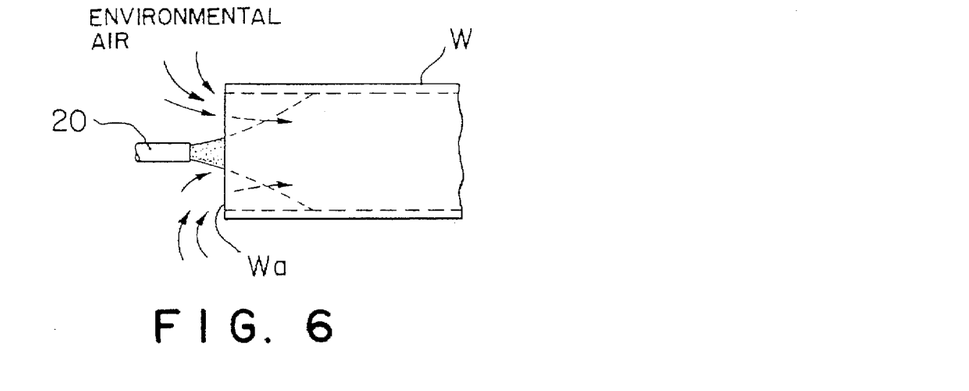
FIG. 6 is a side view which shows the positional relationship between a cooling air feeding nozzle and a work.
Figure 7:
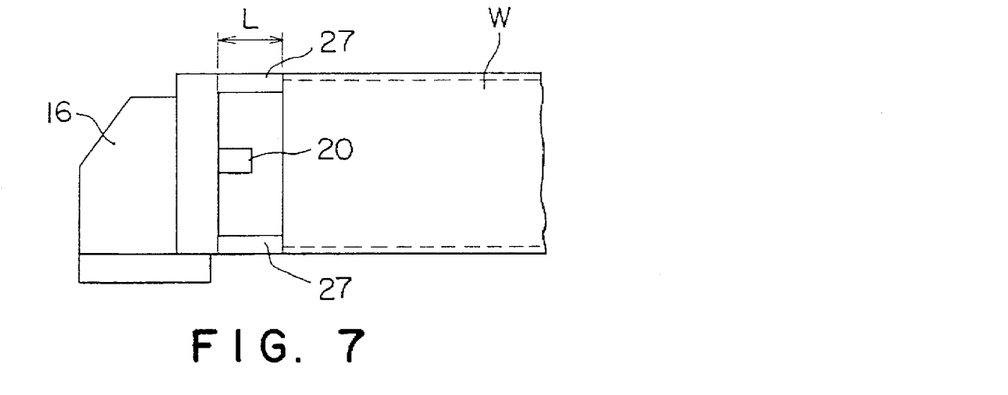
FIG. 7 is a side view which shows a cooling head and the work in accordance with another embodiment of the present invention.

The aforementioned cooling head 16 contacts with one opening end Wa of the work W. Alternatively, as shown in FIG. 6 and FIG. 7, the cooling head 16 may be parted away from the opening end Wa of the work W by a distance or gap L. In this case, environmental air is introduced into the interior of the work W by Venturi's effect through the opening end Wa so that flowing of the air in the work W can be uniformalized.

In this case, to firmly set the distance or gap L, a space member 26 may be interposed between the cooling head 16 and the work W.

Next, a mode of operation of the hole forming apparatus constructed in the aforementioned manner will be described below.

Figure 4:
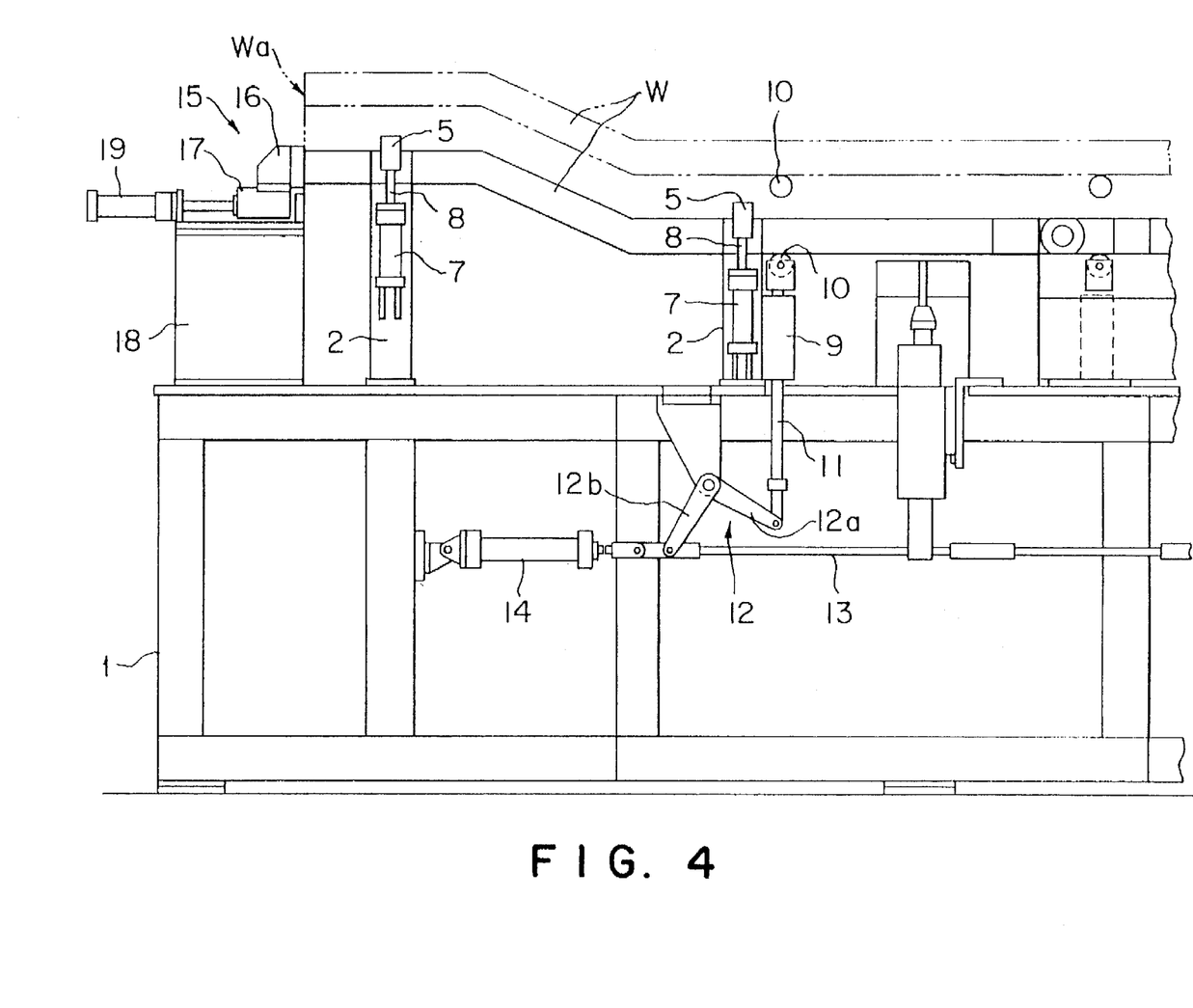
FIG. 4 is a fragmentary enlarged side view which shows an essential part of the hole forming apparatus.
Figure 11:
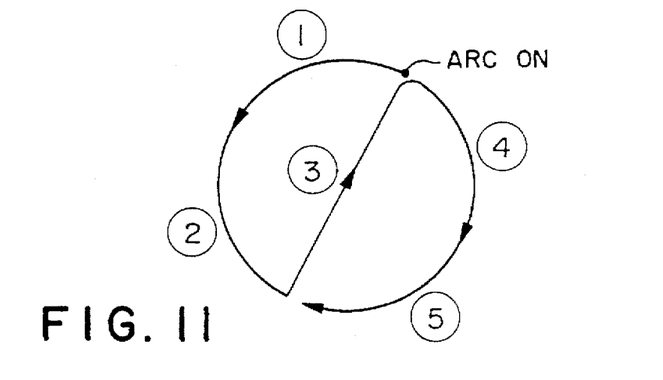
FIG. 11 is an explanatory view which shows the locus of a plasma torch employed for the hole forming operation according to the present invention.

The work W to be subjected to hole forming is supported by the rollers 10 of the lifter 9 with a substantially horizontal attitude at the standby position as shown in FIG. 2 and FIG. 4. While the foregoing state is maintained, the driving cylinder 14 is actuated so as to allow the bell crank 12 to be turned in the clockwise direction, causing the vertical rod 11 to be lowered, whereby the work W is lowered until it is supported by the work receivers 4. Subsequently, the driving cylinder 19 is actuated to displace the thrust block 17 in the rightward direction as viewed in the drawing so that the cooling head 16 is brought in contact with the left-hand end surface of the work W. Then, the work W is displaced in the longitudinal direction to make position determination. When the work W is set at a normal position, the driving cylinder 7 is actuated so that the work W is firmly held by displacing the clamp member 5 in the retaining direction. While the foregoing state is maintained, the arm robot 21 is displaced so that the plasma torch 23 is set at the position where a hole is to be formed through the work W. At the same time, cold air is blown into the inside of the work W. When the plasma torch 23 is completely set and cold air is blown into the inside of the work W from the cooling nozzle 20 of the cold air blowing unit 15, a signal is inputted into the plasma controlling unit 25, and thereafter, a plasma ark is irradiated. The plasma torch 23 is displaced along a locus represented by (1)—(2)—(3)—(4) and (5) as shown in FIG. 11 to form a round hole having a predetermined diameter. It has been found that when the plasma torch 23 is displaced along the locus including a straight line as shown in FIG. 11, a quantity of waste material generated by the plasma torch 23 can be reduced.

According to the present invention, since cold air normally flows through the formed hole on the hollow elongated work W while the plasma torch 23 forms the hole on the side wall of the work W, the dross generated during plasma working is blown off by a stream of the cold air without any adhesion to the inner wall surface of the work W. In addition, since the processing part of the work W is cooled by the cold air during hole forming operation performed by the plasma torch 23, burning of the rust preventing oil can be prevented.

As shown in FIG. 6 and FIG. 7, in the case that the cooling head 16 is disposed directly in front of the open end of the work W to keep a distance L or gap therebetween, environmental air is introduced into the work W by the Venturi effect, enabling a stream of air in the work W to be uniformalized.

Figure 8:
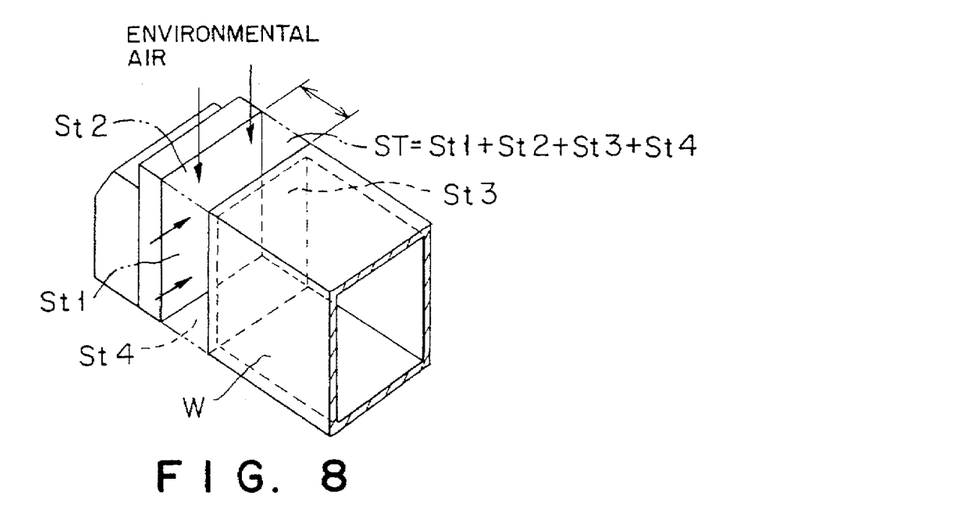
FIG. 8 is a perspective view which schematically shows how an environmental air is introduced into the interior of the work.

FIG. 8 shows by way of perspective view an area through which environmental air is introduced in the case that the cooling head 16 is disposed while a gap L is held between the cooling head 16 and the opening end Wa of the work W having a rectangular sectional contour. In this case, the total area ST is represented by the following equation.

$$ST = St1 + St2 + St3 + St4$$

Figure 9:
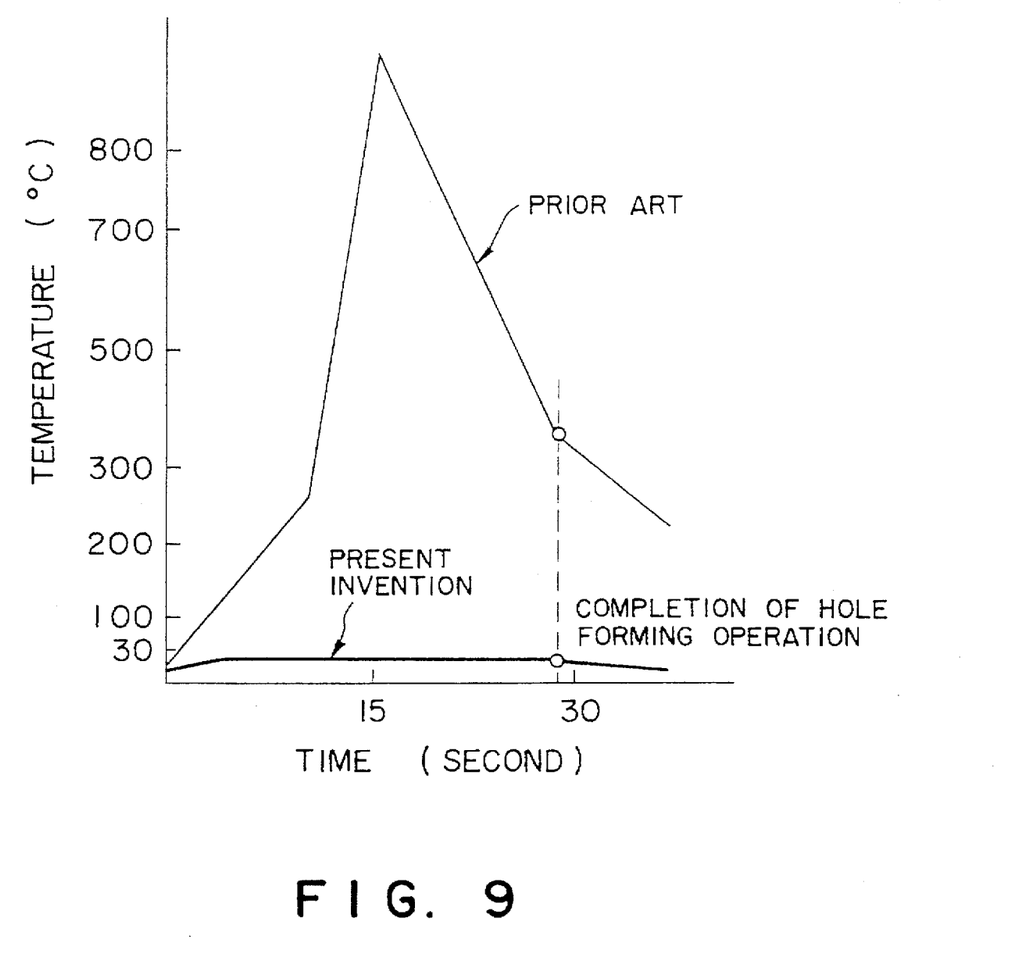
FIG. 9 is an explanatory view which shows how the temperature measured in the vicinity of a hole varies as time elapses.
Figures 10A, 10B:
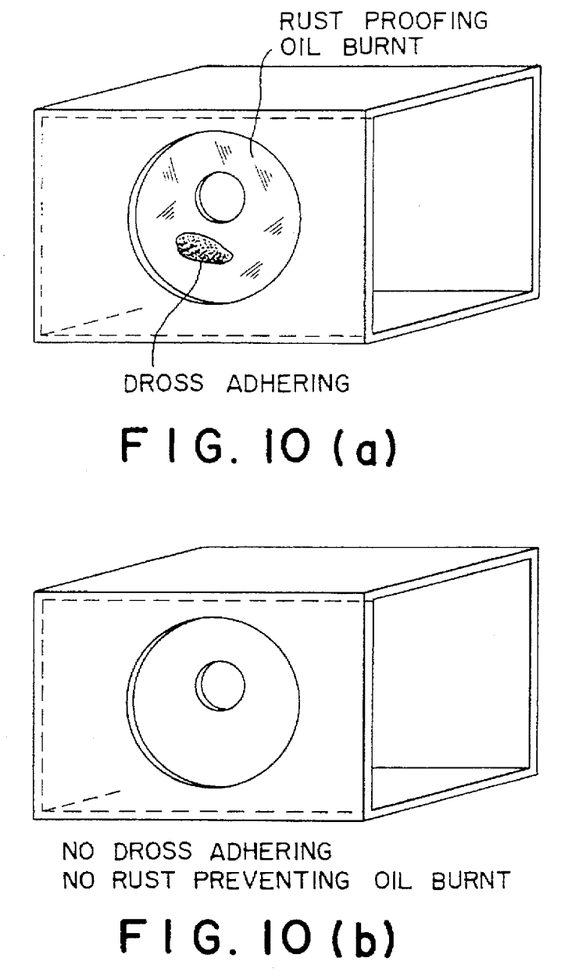
FIG. 10(a) is an explanatory view which shows that dross adheres the side surface of the work and rust proofing oil is locally burnt during a conventional plasma hole forming operation.
FIG. 10(b) is an explanatory view which shows the interior of the work after completion of the hole forming operation performed according to the present invention.

FIG. 9 shows a pattern of elevation of the temperature of the work when a hole is formed through the work while comparing the present invention with the prior art. As is apparent from the drawing, in the prior art, the heated temperature of the work exceeds maximum 800° C. but according to the present invention, elevation of the temperature of the work can be suppressed to be 30° C. or less.

While the presently preferred embodiment of the present invention has been shown and described, it is to be understood that this disclosure is for the purpose of illustration and that various change and modification mat be made without departure from the scope of the invention as set forth in the appended claims.

What is claimed is:

1. A hole forming apparatus having a plurality of receiving means for receiving a lengthy work mounted on a base frame, a lifter provided between said receiving means and said work for pushing said work to a predetermined position, a plurality of locators for setting said work at said predetermined position, a plasma torch mounted on said base frame for making a hole in said lengthy work, a robot provided at a vicinity of said hole forming apparatus for supporting said plasma torch and for allowing movement to at any direction, and a robot control unit for controlling said robot, comprising:

an air blowing unit with a blowing nozzle mounted on a bracket of said base frame for blowing pressurized air to an open end portion of said work; and a space member interposed between a cooling head of said bracket and said work for spacing a gap to induce a fresh air into said open end portion and for cooling down said work while forming a hole in said work by said plasma torch so as to avoid rust and dross from adhering near said hole and to obtain a precise diameter of said hole.

2. The hole forming apparatus as claimed in claim 1, wherein said hole forming tool is a plasma torch.

3. The hole forming apparatus as claimed in claim 1, wherein said cold air feeding unit consists of a thrust block adapted to be displaced toward the opening end of the work in the forward/rearward direction, a cooling head borne by said thrust block, and a cooling air nozzle held on said cooling head.

4. The hole forming apparatus as claimed in claim 1, wherein said cooling head is located directly in front of the opening end of the work with a predetermined distance left therebetween so as to allow environmental air to be introduced into the work.

5. The hole forming apparatus as claimed in claim 1, wherein said predetermined distance is set to be 0.5 to 1.2 times of a diameter of said nozzle.

6. A hole forming apparatus comprising:

a plurality of receiving means for receiving a lengthy work mounted on a base frame, a lifter provided between said receiving means and said work for pushing said work to a predetermined position, a plurality of locators for setting said work at said predetermined position, a plasma torch mounted on said base frame for making a hole in said lengthy work, a robot provided at a vicinity of said hole forming apparatus for supporting said plasma torch and for allowing movement to at any directions, a robot control unit for controlling said robot, an air blowing unit with a blowing nozzle mounted on a bracket of said base frame for blowing pressurized air to an open end portion of said work; and a space member interposed between a cooling head of said bracket and said work for spacing a gap to induce a fresh air into said open end portion and for cooling down said work while forming a hole in said work by said plasma torch so as to avoid rust and dross from adhering near said hole and to obtain a precise diameter of said hole.

* * * * *